(12) United States Patent
Shao

(10) Patent No.: US 6,476,884 B1
(45) Date of Patent: Nov. 5, 2002

(54) SUPPORT STRUCTURE FOR LIQUID CRYSTAL DISPLAY SCREEN

(76) Inventor: Yu-Hsuan Shao, No. 95, Lane 125, Ren-Ai Street, San Zhong, Taipei (TW)

( * ) Notice: Subject to any disclaimer, the term of this patent is extended or adjusted under 35 U.S.C. 154(b) by 0 days.

(21) Appl. No.: 10/000,932

(22) Filed: Nov. 2, 2001

(51) Int. Cl.⁷ .......................... G02F 1/1333; E09G 3/00
(52) U.S. Cl. ...................... 349/58; 298/917; 298/278.1
(58) Field of Search .................... 349/58, 60; 348/917, 348/278.1; 361/681, 68

(56) References Cited

U.S. PATENT DOCUMENTS 6,229,584 B1 * 5/2001 Chuo et al. .................... 349/58
6,367,756 B1 * 4/2002 Wang ...................... 248/276.1

* cited by examiner

Primary Examiner—Toan Ton
(74) Attorney, Agent, or Firm—Brown & Michaels, PC

(57) ABSTRACT

A support structure for connecting to a back of an LCD screen to support the same includes a base, onto which a data access device is fixedly mounted with a front of the device facing sideward; a supporting arm extended upward from the base to slightly incline forward and having a hollow upper section, two L-shaped brackets respectively having one arm fixedly connected to the back of the LCD screen being rotatably connected at another arm to upper ends of two sidewalls of the hollow upper section; and a box-type power supply unit removably received in the hollow upper section to electrically connect an external power source to the LCD screen. By adjusting an angular position of the two L-shaped brackets relative to the supporting arm, the LCD screen could be set to a desired angle of elevation.

1 Claim, 2 Drawing Sheets

SUPPORT STRUCTURE FOR LIQUID CRYSTAL DISPLAY SCREEN

BACKGROUND OF THE INVENTION

1. Field of the Invention

The present invention relates to a support structure for liquid crystal display (LCD) screen, and more particularly to a support structure that is connected to a back case of an LCD screen, so that the latter is adjustable in its angle of elevation relative to the support structure.

2. Description of the Prior Art

The liquid crystal display (LCD) has gradually taken the place of the conventional cathode-ray tube (CRT) display in recent years. Since an LCD screen is light, thin and compact, and produces decreased amount of radiation and is therefore friendly to a user's eyes and health, as compared to a CRT display screen, it has been widely employed in computers and audio-visual equipment.

In the early stage, the LCD screen is screwed to a support frame in the shape of an inverted letter T having a lower vertical post. A power cord equipped with power supply devices (transformer/stabilizer) is connected to the LCD screen to provide power needed by the LCD screen to function normally. Thereafter, an improved design puts the power supply devices in the vertical post of the inverted T-shaped support frame to save extra spaces for accessories and/or components of the LCD screen and to increase the stability of the support frame. Taiwan New Utility Model Patent Application No. 87205041 entitled "Liquid Crystal Display Structure" discloses an inverted T-shaped support frame having a vertical post formed from a front and a rear cover. The front and the rear covers of the vertical post are closed to each other and define a space between them for accommodating the power supply devices therein. This design saves extra spaces for accessories and/or components and beautifies an appearance of the support frame. However, the vertical post formed from two closed covers has largely reduced structural strength and complicated structure to increase manufacturing cost thereof. Moreover, since the power supply devices are fixedly received in the vertical post and form an integral part of the inverted T-shaped support frame, any damaged accessory and/or component of the power supply devices necessitates replacement of the entire support frame. Another disadvantage of the conventional support frame is the LCD screen is fixedly connected to the support frame and could not be vertically adjusted to a desired angle of elevation.

SUMMARY OF THE INVENTION

It is therefore a primary object of the present invention to provide a support structure for liquid crystal display (LCD) screen that is light, simple, compact and low-cost, and allows vertical adjustment of an angle of elevation of the LCD screen supported thereon, so that the LCD screen is more convenient and practical for use.

Another object of the present invention is to provide a support structure for LCD screen that allows attachment of a data access device thereto, such as a sideward oriented compact disc read-only memory (CD-ROM), and thereby saves extra spaces for peripherals and increases the stability of the entire support structure. The sideward oriented data access device could be more conveniently manipulated on the support structure.

A further object of the present invention is to provide an improved support structure for LCD screen, in which a power supply unit is enclosed in an insulated box that is then removably received in a hollow section of a supporting arm of the support structure. This design also saves extra spaces for accessories and/or components of the LCD screen, and enables convenient replacement of any damaged accessory and/or component of the power supply unit.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
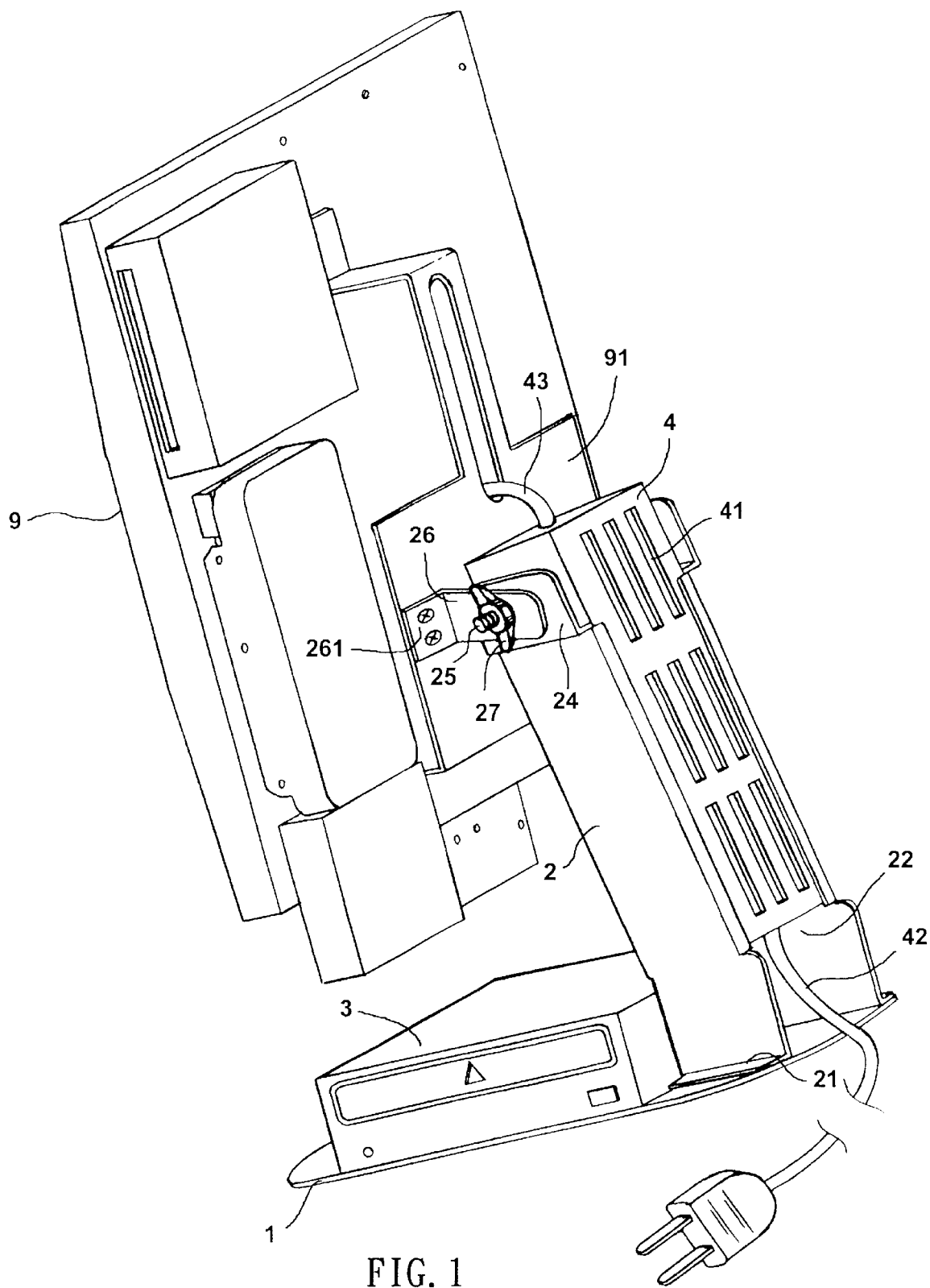
FIG. 1 is an assembled perspective view showing a support structure for LCD screen according to the present invention is connected to a back case of an LCD screen.
Figure 2:
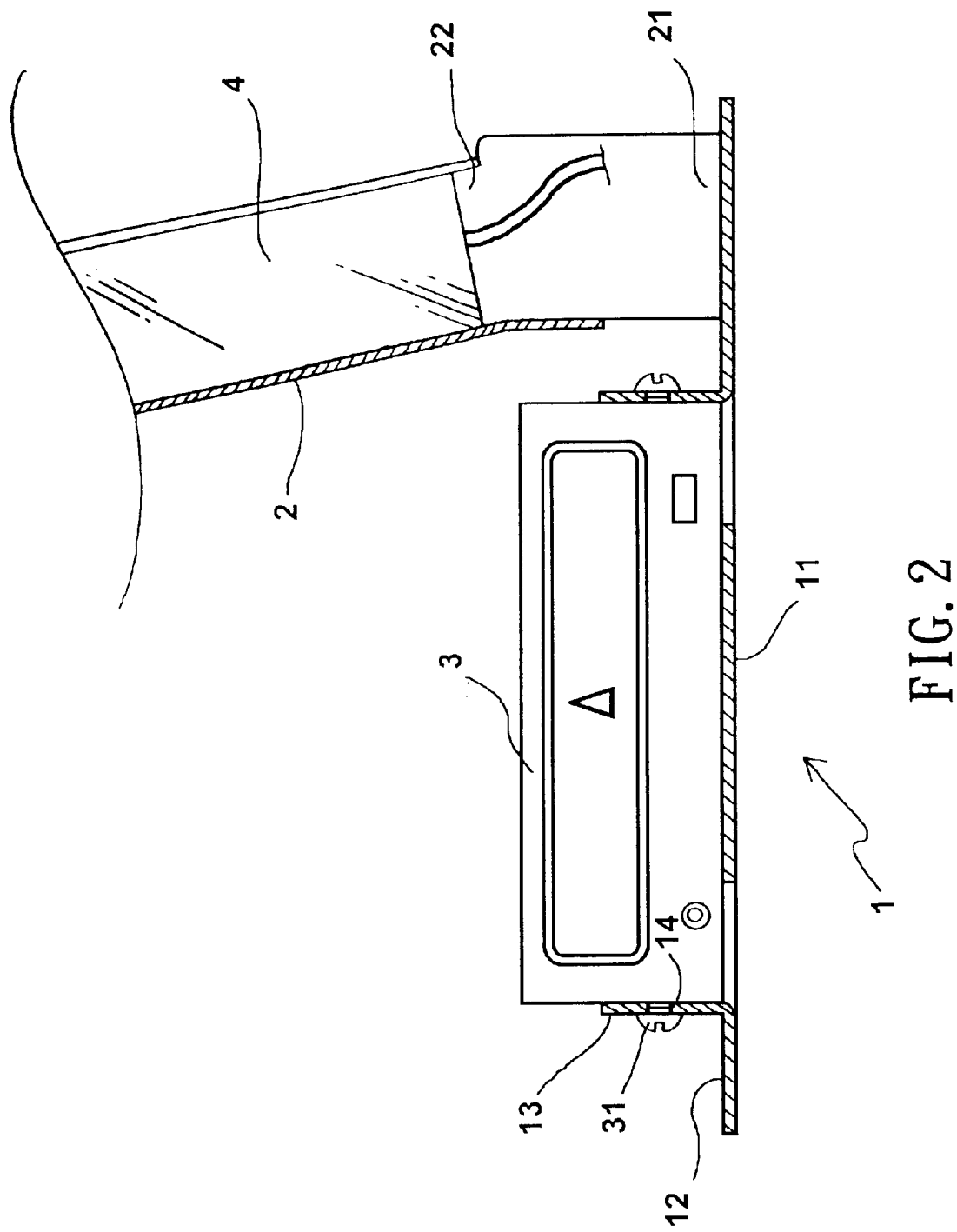
FIG. 2 is a fragmentary sectioned view of the support structure for LCD screen of the present invention.

Please refer to FIGS. 1 and 2 in which a support structure for liquid crystal display (LCD) screen according to the present invention is shown. The support structure mainly includes a base 1, a supporting arm 2, a CD-ROM (compact disc read-only memory) 3, and a box-type power supply unit 4. As shown, the support structure is connected to a back case 91 of a liquid crystal display screen 9.

The base 1 is in the form of a plate having a flat bottom 11, an area of which is large enough for the entire support structure to stably stand on a worktable (not shown). The base 1 is provided at an upper surface 12 of the flat bottom 11 with two spaced and symmetrically arranged mounting walls 13. The two mounting walls 13 are transversely extended across the base 1 and are provided with a plurality of through holes 14. A space defined between the two mounting walls 13 is large enough for an outer case of the CD-ROM 3 to fitly position therein, so that a front of the CD-ROM 3 faces sideward relative to the base 1. Fastening means, such as screws 31, are threaded into the through holes 14 to firmly lock the CD-ROM 3 to the mounting walls 13 and accordingly the base 1.

The supporting arm 2 is connected at a lower end 21 to a rear side of the base 1, so that a hollow upper section 22 of the supporting arm 2 extends upward and slightly inclines forward. The lower end 21 of the supporting arm 2 may be connected to the base 1 through welding or screwing. Two sidewalls of the hollow upper section 22 of the supporting arm 2 are provided at respective upper ends with two sideward and outward projected wing portions 24. Each wing portion 24 is provided with a screw 25 that is perpendicular to and outward extends from the wing portion 24. An L-shaped movable bracket 26 having two arms and a wing nut 27 are sequentially rotatably mounted on each screw 25. By loosening the wing nuts 27 from the screws 25, the movable brackets 26 may be adjusted to a desired angular position relative to the supporting arm 2. The wing nuts 27 could then be tightened against the screws 25 again to firmly locate the movable brackets 26 in the previously adjusted angular position. One of the two arms of each movable bracket 26 that forward extends to locate in front of the supporting arm 2 serves as a mounting plate 261 for attaching to the back case 91 of the liquid crystal display screen 9.

The power supply unit 4 has a rectangular box that is made of an insulating material and has a plurality of radiating holes 41 evenly distributed over surfaces thereof, so that heat produced by the power supply unit 4 during operation thereof dissipates into air via the radiating holes 41. A first power cord 42 is extended from a lower end of the box-type power supply unit 4 for plugging onto an external socket, and a second power cord 43 is extended from an upper end of the box-type power supply unit 4 to the display screen 9 for supplying power to the latter. The power supply unit 4 is so sized that it is fitly and removably received in the hollow upper section 22 of the supporting arm 2.

The following are some advantages of the support structure of the present invention for supporting an LCD screen:

1. It has simple but effective structure that is light in weight and could be manufactured at lowered cost.
2. It allows the LCD screen 9 connected to the supporting arm 2 via the movable brackets 26 to be vertically adjusted to a desired angle of elevation relative to the supporting arm 2, so that the LCD screen 9 is more convenient for use.
3. The mounting of the CD-ROM 3 on the base 1 of the support structure with its front facing sideward not only saves extra space needed for the CD-ROM 3 but also increases an overall stability of the support structure and allows convenient manipulating of the CD-ROM 3.
4. The box-type power supply unit 4 and the power cords 42, 43 thereof are removably received in the hollow upper section 22 of the supporting arm 2 to facilitate convenient replacement of any damaged element of the power supply unit 4.

It is understood the present invention has been described with a preferred embodiment thereof and many changes and modifications in the described embodiment can be carried out without departing from the scope and the spirit of the invention. For example, to meet a user's requirement for various peripherals, other types of data access equipment, such as a floppy disk drive, a removable hard drive, or the like, may replace the CD-ROM 3 and be mounted on the base 1. Therefore, the present invention is intended to be limited only by the appended claims.

What is claimed is:

1. A support structure being connected to a back case of a liquid crystal display (LCD) screen such that said LCD screen is vertically adjustable to any desired angle of elevation relative to said support structure, comprising:

a base including a flat bottom having an area large enough for said support structure to stably stand on a working plane, and mounting means provided on said flat bottom at predetermined positions;

a data access device being mounted on said base in a space defined by said mounting means, such that a front of said data access device faces one lateral side of said base;

a supporting arm being fixedly connected at a lower end to a rear side of said base and having a hollow upper section extended upward and slightly inclined forward, upper ends of two sidewalls of said hollow upper section being sideward and outward projected to provide two wing portions, each of said wing portions having a screw perpendicularly and outward extended therefrom for an L-shaped movable bracket and a wing nut to sequentially mount thereto, each said L-shaped movable bracket including a front arm that forward extends to locate in front of said supporting arm for connecting to said back case of said LCD screen; and loosening of said wing nuts from said screws enabling adjustment of said movable brackets and accordingly said LCD screen to a desired angle of elevation, and tightening of said wing nuts against said screws again enabling firm locking of said movable brackets and accordingly said LCD screen to said previously adjusted angle of elevation; and a power supply unit being enclosed in a rectangular insulated box that is fitly and removably received in said hollow upper section of said supporting arm, and a first and a second power cord being extended from a lower and an upper end, respectively, of said insulated box to connect to an external power source and said LCD screen, respectively, for supply electric power to said LCD screen.

* * * * *